(12) United States Patent
Jain

(10) Patent No.: US 11,816,238 B2
(45) Date of Patent: Nov. 14, 2023

(54) ASSIGNMENT OF COMPUTER PRIVILEGES TO USER BASED ON AUTOMATED SKILL ESTIMATE

(71) Applicant: SAP SE, Walldorf (DE)

(72) Inventor: Shashank Mohan Jain, Bangalore (IN)

(73) Assignee: SAP SE, Walldorf (DE)

( * ) Notice: Subject to any disclaimer, the term of this patent is extended or adjusted under 35 U.S.C. 154(b) by 373 days.

(21) Appl. No.: 17/197,821

(22) Filed: Mar. 10, 2021

(65) Prior Publication Data
US 2022/0292210 A1   Sep. 15, 2022

(51) Int. Cl.
*G06F 21/62* (2013.01)
*G06N 3/08* (2023.01)

(52) U.S. Cl.
CPC ........... *G06F 21/6218* (2013.01); *G06N 3/08* (2013.01)

(58) Field of Classification Search
CPC .......... G06F 21/6218; G06F 21/45; G06F 2221/2149; G06N 3/08
See application file for complete search history.

(56) References Cited

U.S. PATENT DOCUMENTS

| | | | | |
|---|---|---|---|---|
| 7,237,122 B2* | 6/2007 | Kadam | ............... | G06F 21/6209 726/19 |
| 10,902,321 B2* | 1/2021 | Spagnola | ............... | G06F 17/16 |
| 10,979,461 B1* | 4/2021 | Cervantez | ............. | H04L 63/105 |
| 11,310,237 B2* | 4/2022 | Spurlock | ............... | H04L 63/10 |
| 2010/0077475 A1* | 3/2010 | Deschenes | ................ | G06F 8/62 726/21 |
| 2014/0201345 A1* | 7/2014 | Abuelsaad | .............. | H04L 67/10 709/223 |
| 2020/0120138 A1* | 4/2020 | Sanders | .............. | G06F 18/2323 |
| 2021/0357376 A1* | 11/2021 | Jain | ....................... | G06F 16/285 |
| 2022/0343003 A1* | 10/2022 | Kumar | ................ | G06F 9/44505 |

* cited by examiner

*Primary Examiner* — Han Yang
(74) *Attorney, Agent, or Firm* — Buckley, Maschoff & Talwalkar LLC

(57) ABSTRACT

According to some embodiments, a user vector generator may access information about a user (e.g., a software deployment developer or operator) in a user data store that contains electronic records each associated with different user. Each record may include, for example, a user identifier and user characteristics. Based on the user characteristics, the system may automatically generate a user vector indicating a computing environment skillset level for that user (e.g., beginner, intermediate, or expert). A machine learning privilege assignment platform may receive an indication of the user vector for the user and, based on the user vector and a machine learning algorithm, generate a privilege decision for that user (e.g., when the user attempts to update the system). An indication of the privilege decision may be output, according to some embodiments, to an SMT solver to review the privilege decision before granting the user access to the computing environment.

15 Claims, 10 Drawing Sheets

| DEVOP IDENTIFIER 902 | DEVOP RESUME 904 | DEVOP LOG FILES 906 | SUPPLEMENTAL DATA 908 | DEVOP VECTOR 910 |
|---|---|---|---|---|
| D_101 | RESUME.TEXT | L_101 | SUPERVISOR EVALUATION | BEGINNER |
| D_102 | RESUME LINK | L_102 | SOCIAL MEDIA | INTERMEDIATE |
| D_103 | NONE | L_103 | PUBLISHED PAPERS | EXPERT |
| D_104 | ONLINE PROFILE | L_104 | SIMILAR USERS | BEGINNER |

FIG. 9

ASSIGNMENT OF COMPUTER PRIVILEGES TO USER BASED ON AUTOMATED SKILL ESTIMATE

BACKGROUND

An enterprise may provide user access to a computing environment to facilitate computing tasks. For example, the enterprise might let various users install or update Platform-as-a-Service ("PaaS") application deployments to help the enterprise process purchase orders, adjust human resources information, generate invoices, etc. Letting an inexperienced user (e.g., administrator or operator) access the computing environment can, however, lead to problems. For example, an application in a PaaS provider might only be allowed x amount of resources. This configuration, if checked at all, is usually checked at runtime. There may also be constraints that are sometimes defined that need to be checked at runtime. This can lead to an unnecessary waste of system resources such as compiling an application, attempting a deployment, etc. Such a situation could also lead to other unwanted issues and outages.

Consider, for example, an inexperienced user who changes a disk type of a database deployment (such as by changing a YAML configuration file in bosh or Kubernetes). If this change was unintentional, it could be catastrophic for an enterprise because a new disk would be created and data from the old disk would need to be copied to the new disk. If 1 terabyte ("TB") of data copy is initiated from the old disk to the new disk, a substantial amount of network bandwidth may be consumed. Moreover, there may be a functionality outage until the copy is complete. Manually reviewing a user's experience level, however, to avoid these types of problems can be a time consuming and error-prone process.

It would therefore be desirable to facilitate assignment of computer privileges to users based on an automated skill estimate in a secure, automatic, and efficient manner.

SUMMARY

According to some embodiments, methods and systems may be associated with user access to a computing environment. Initially, a user vector generator may access information about a user (e.g., a software deployment developer or operator) in a user data store that contains electronic records each associated with a different user. Each record may include, for example, a user identifier and user characteristics. Based on the user characteristics, the system may automatically generate a user vector indicating a computing environment skillset level for that user (e.g., beginner, intermediate, or expert). A machine learning privilege assignment platform may receive an indication of the user vector for the user and, based on the user vector and a machine learning algorithm, generate a privilege decision for that user (e.g., when the user attempts to update the system). An indication of the privilege decision may be output, according to some embodiments, to a Satisfiability Modulo Theories ("SMT") solver to review the privilege decision before granting the user access to the computing environment.

Some embodiments comprise: means for accessing, by a user vector generator, information about a user in a user data store that contains electronic records each associated with a user, each record including a user identifier and user characteristics; based on the user characteristics, means for automatically generating a user vector indicating a computing environment skillset level for that user; and means for outputting an indication of the user vector.

Other embodiments comprise: means for receiving, by a computer processor of a machine learning privilege assignment platform, an indication of a user vector for a user from a user vector generator; based on the user vector and a machine learning algorithm, means for generating a privilege decision for that user; and means for outputting an indication of the privilege decision (e.g., to an SMT solver) to review the privilege decision before granting the user access to the computing environment.

Some technical advantages of some embodiments disclosed herein are improved systems and methods to facilitate assignment of computer privileges to users based on an automated skill estimate in a secure, automatic, and efficient manner.

BRIEF DESCRIPTION OF THE DRAWINGS

FIG. 9 is portion of a devop data store in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
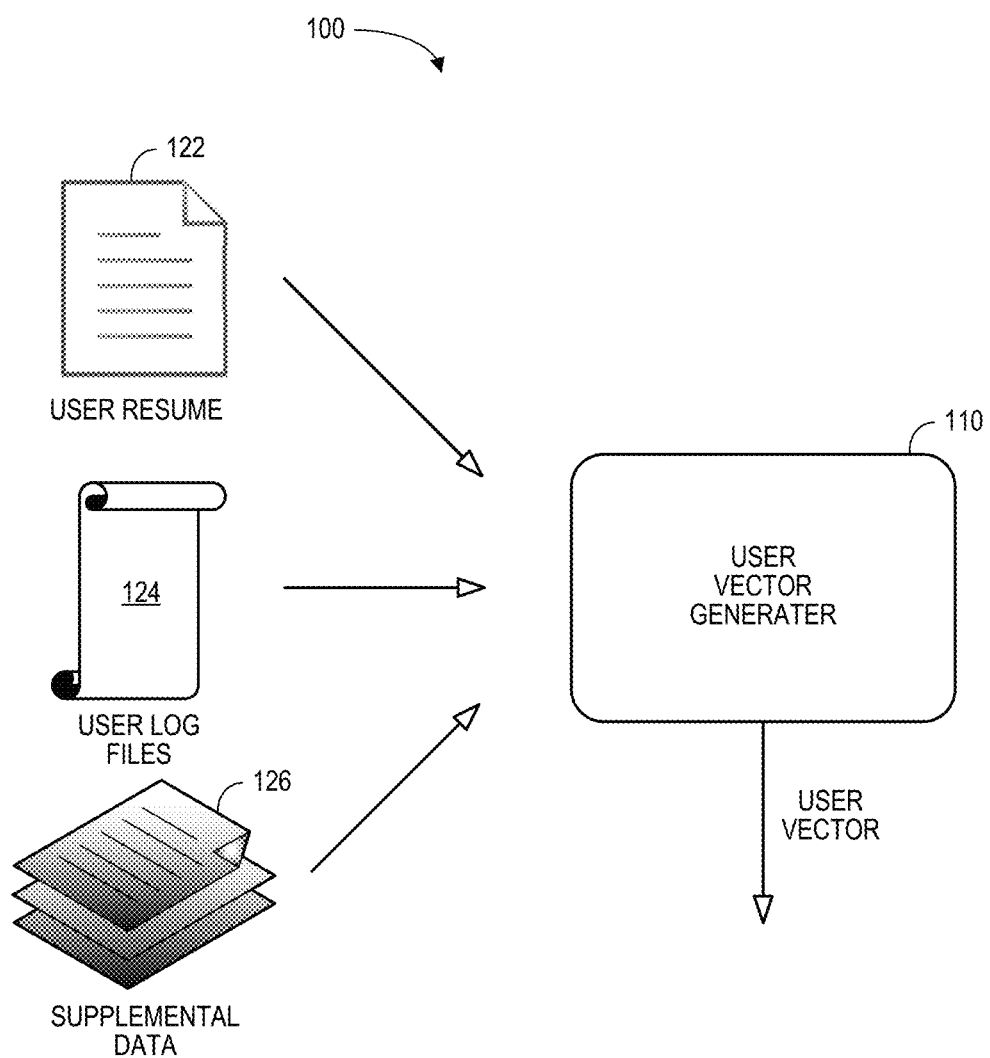
FIG. 1 is a high-level block diagram of a user vector generation system in accordance with some embodiments.

FIG. 1 is a high-level block diagram of a user vector generation system 100 in accordance with some embodiments. The system 100 includes a user vector generator 110 that accesses information from a user resume 122, user log files 124, supplemental data 126, etc. The user vector generator 110 might use this information, for example, to first project a user into an abstract mathematical vector space and thereby determine a level of skill associated with that user. The process might be performed automatically or be initiated via a command from a remote operator interface device. As used herein, the term "automatically" may refer to, for example, actions that can be performed with little or no human intervention.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The user (e.g., developer or operator) vector generator 110 may store information into and/or retrieve information from various data stores (e.g., associated with the user resume 122, user log files 124, supplemental data 126, etc.), which may be locally stored or reside remote from the user vector generator 110. Although a single user vector generator 110 and data sources 122, 124, 126 are shown in FIG. 1, any number of such devices or sources may be included. Moreover, various devices described herein might be combined according to embodiments of the present invention. For example, in some embodiments, the user resume 122, user log files 124, supplemental data 126, and the user vector generator 110 might comprise a single apparatus. The system 100 functions may be performed by a constellation of networked apparatuses, such as in a distributed processing or cloud-based architecture.

A user or administrator may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define how systems interact) and/or provide or receive automatically generated recommendations or results from the system 100.

Figure 2:
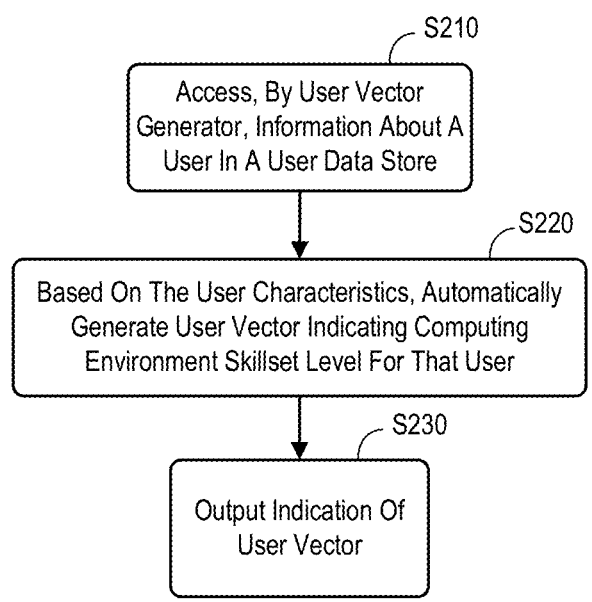
FIG. 2 is a user vector generation method according to some embodiments.

FIG. 2 is a user vector generation method that might performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a user vector generator may access information about a user in a user data store that contains electronic records each associated with a different user. Each record may include, for example, a user identifier and user characteristics. As used herein, the term "user" might refer to, for example, software deployment developer, a software deployment operator, etc. (also referred to as a "devop" herein).

Based on the user characteristics, at S220 the system may automatically generate a user vector indicating a computing environment skillset level for that user. The user vector might indicate, for example, a beginner user, an intermediate user, or an expert user. Note that the user vector might include any number of categories, numerical scores, access types that are allowed (or not allowed), etc. According to some embodiments, the generation of the user vector is further based on machine learning architectures like Transformers training, using a user resume, user log files, supplemental data, etc. For example, the supplemental data might include social media data (e.g., his or her LINKEDIN® profile), a supervisor evaluation, published papers (e.g., articles in technical journals), third-party data (e.g., verified certifications or completed classes or courses), etc.

Figure 3:
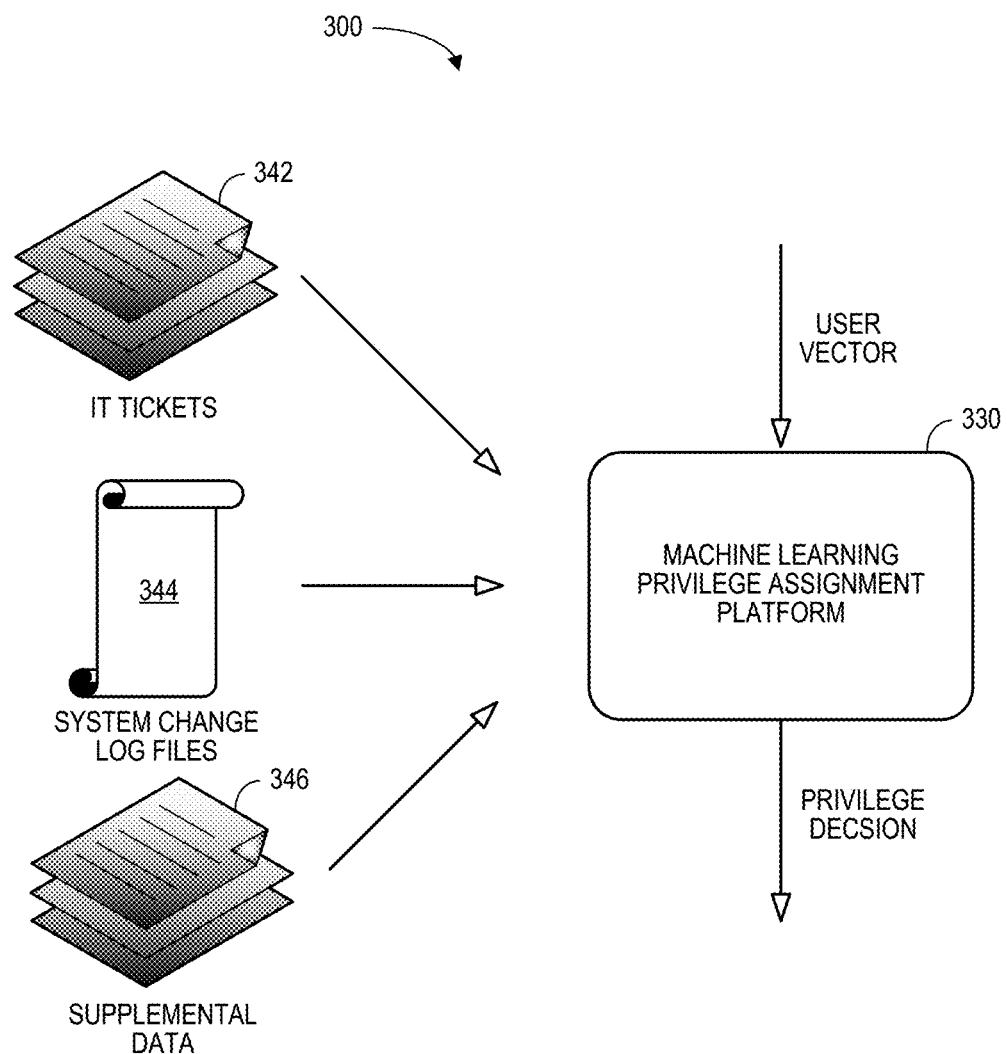
FIG. 3 is a high-level block diagram of a privilege decision system in accordance with some embodiments.

At S230, the system may output an indication of the user vector. According to some embodiments, the user vector might be transmitted (e.g., in connection with an authentication and/or authorization flows) to help the system make a user access privilege decision (will the user be allowed to install software, make a change or upgrade, etc.). For example, FIG. 3 is a high-level block diagram of a privilege decision system 300 in accordance with some embodiments. The system 300 includes a machine learning privilege assignment platform 330 that accesses information from Information Technology ("IT") tickets 342 (e.g., reporting computer system problems, detailing resolutions, etc.), system change log files 344, supplemental data 346, etc. As used herein, the term "machine learning" might be associated with, for example, deep learning, a neural network, a classifier, etc. The machine learning privilege assignment platform 330 might use the accessed information, for example, to help determine a privilege decision based on a user vector and a change requested by a user (e.g., a decision granting or denying access to the user). The process might be performed automatically or be initiated via a command from a remote operator interface device.

As used herein, devices, including those associated with the system 300 and any other device described herein, may exchange information via any communication network which may be one or more of a LAN, a MAN), a WAN, a proprietary network, a PSTN, a WAP network, a Bluetooth network, a wireless LAN network, and/or an IP network such as the Internet, an intranet, or an extranet. Note that any devices described herein may communicate via one or more such communication networks.

The machine learning privilege assignment platform 330 may store information into and/or retrieve information from various data stores (e.g., associated with the IT tickets 342, system change log files 344, supplemental data 346, etc.), which may be locally stored or reside remote from the machine learning privilege assignment platform 330. Although a single machine learning privilege assignment platform 330 and data sources 342, 344, 346 are shown in FIG. 3, any number of such devices or sources may be included. Moreover, various devices described herein might be combined according to embodiments of the present invention. For example, in some embodiments, the IT tickets 342, system change log files 344, supplemental data 346, and the machine learning privilege assignment platform 330 might comprise a single apparatus. The system 300 functions may be performed by a constellation of networked apparatuses, such as in a distributed processing or cloud-based architecture.

A user or administrator may access the system 300 via a remote device (e.g., a PC, tablet, or smartphone) to view information about and/or manage operational information in accordance with any of the embodiments described herein. In some cases, an interactive graphical user interface display may let an operator or administrator define and/or adjust certain parameters (e.g., to define how systems interact) and/or provide or receive automatically generated recommendations or results from the system 300.

Figure 4:
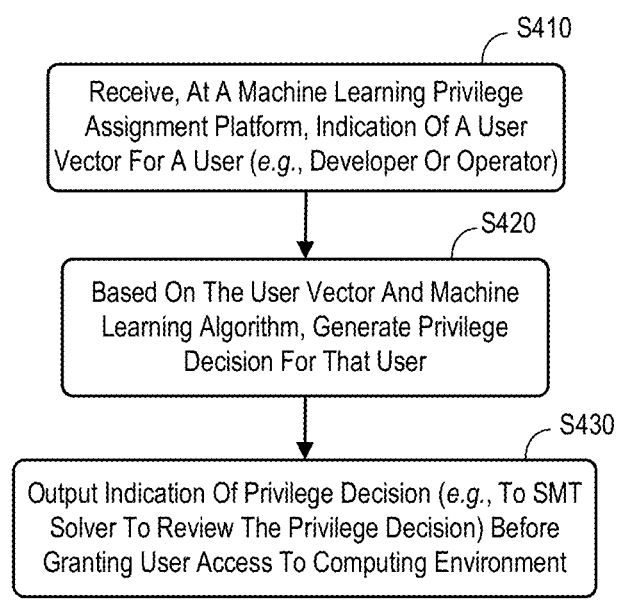
FIG. 4 is a privilege decision method according to some embodiments.

FIG. 4 is a privilege decision method according to some embodiments. At S410, a computer processor of a machine learning privilege assignment platform may receive an indication of a user vector for a user from a user vector generator. The machine learning privilege assignment platform might, for example, need to generate a privilege decision based on a requested computing environment change being made by that user. The requested computing environment change might be associated with, for example, software deployment development, software deployment operation, a software deployment modification, applying a software deployment configuration, etc.

At S420, based on the user vector and a machine learning algorithm, the system may generate a privilege decision for that user. The privilege decision may, according to some embodiments, be achieved by also training a neural network that maps a user vector to specific access decisions. For example, user vector A might be allowed to make garbage collection changes while user vector B is not. Once the network is trained, the system may check if similar users will be allowed to make that change (or not be allowed). According to some embodiments, the machine learning algorithm is associated with a neural network. The neural network might be trained, for example, using IT system tickets, system change log files, supplemental data, etc. At S430, the system may output an indication of the privilege decision (e.g., to an SMT solver). The SMT solver may, for example, review the privilege decision before granting the user access to the computing environment. Note that the SMT solver may act as a global policy check. Even, for example, when the neural network indicates that a user should be allowed to make a particular change, if a global policy prohibits that type of change by that type of user it still might not be allowed by the solver.

Figure 5:
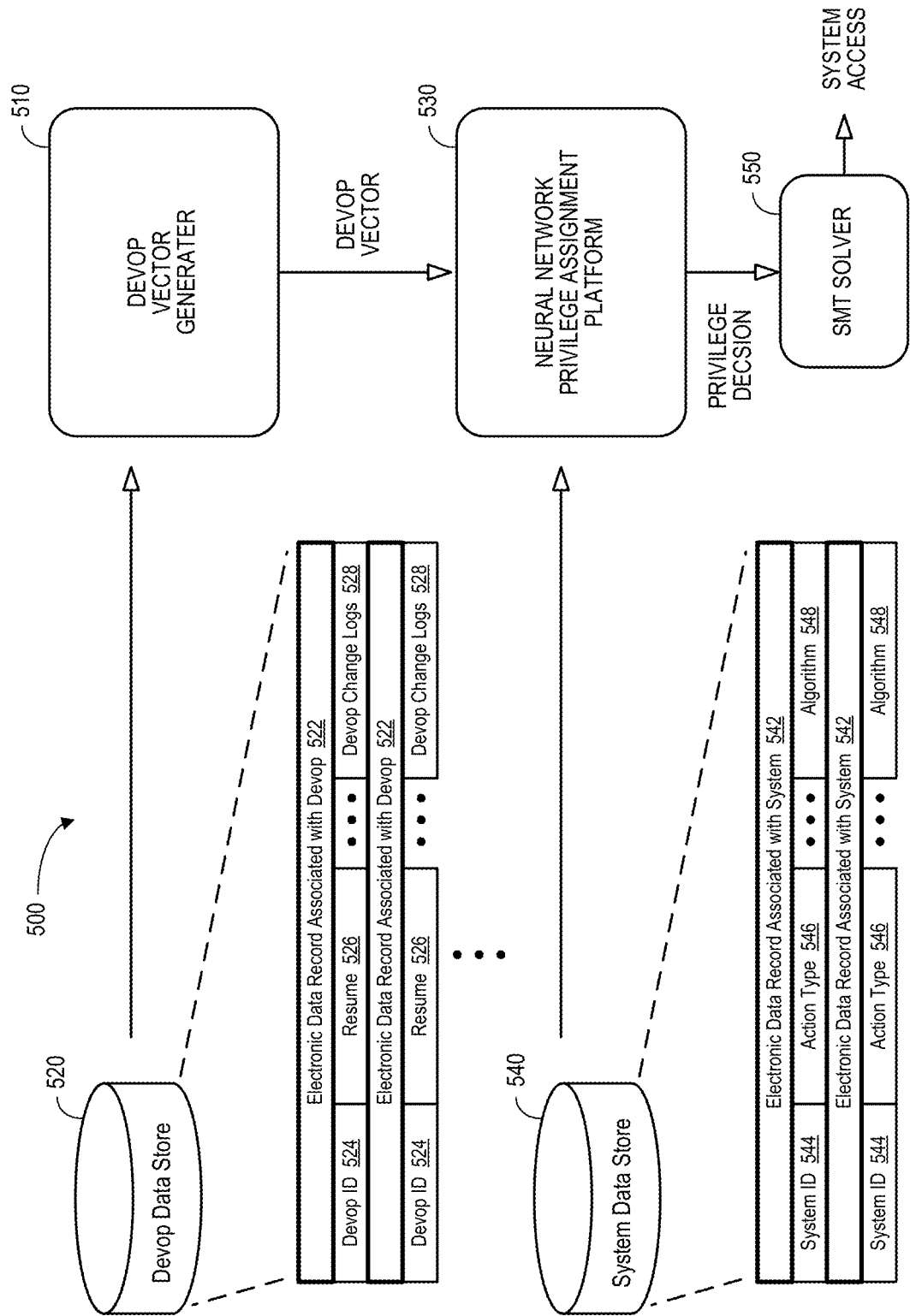
FIG. 5 is a more detailed block diagram of a system in accordance with some embodiments.

FIG. 5 is a more detailed block diagram of a system 500 in accordance with some embodiments. In particular, the system 500 includes a devop vector generator 510 that accesses information from a devop data store 520. The devop data store 520 may contain electronic data records 522 associated with users (e.g., with each record containing a devop identifier 524, resume 526, devop change logs 528, etc.). The devop vector generator 510 might use this information, for example, to help determine a level of skill associated with a user. The process might be performed automatically or be initiated via a command from a remote operator interface device.

The system 500 includes a neural network privilege assignment platform 530 that accesses information from a system data store 540. The system data store 540 may contain electronic data records 542 associated with the computing system (e.g., with each record containing a system identifier 544, an action type 546 (e.g., modifying a system resource or deploying an application), an algorithm 548 (e.g., defining access rules for a particular type of action), etc.). The neural network privilege assignment platform 530 might use the accessed information, for example, to help determine a privilege decision based on the user vector and a change requested by a user (e.g., a decision granting or denying access to the user). According to some embodiments, the privilege decision is output to a SMT solver 550 to review the decision before granting system access to the user. As used herein, the term "SMT solver" may be associated with a formula in first-order logic and/or whether such a formula is satisfiable.

Figure 6:
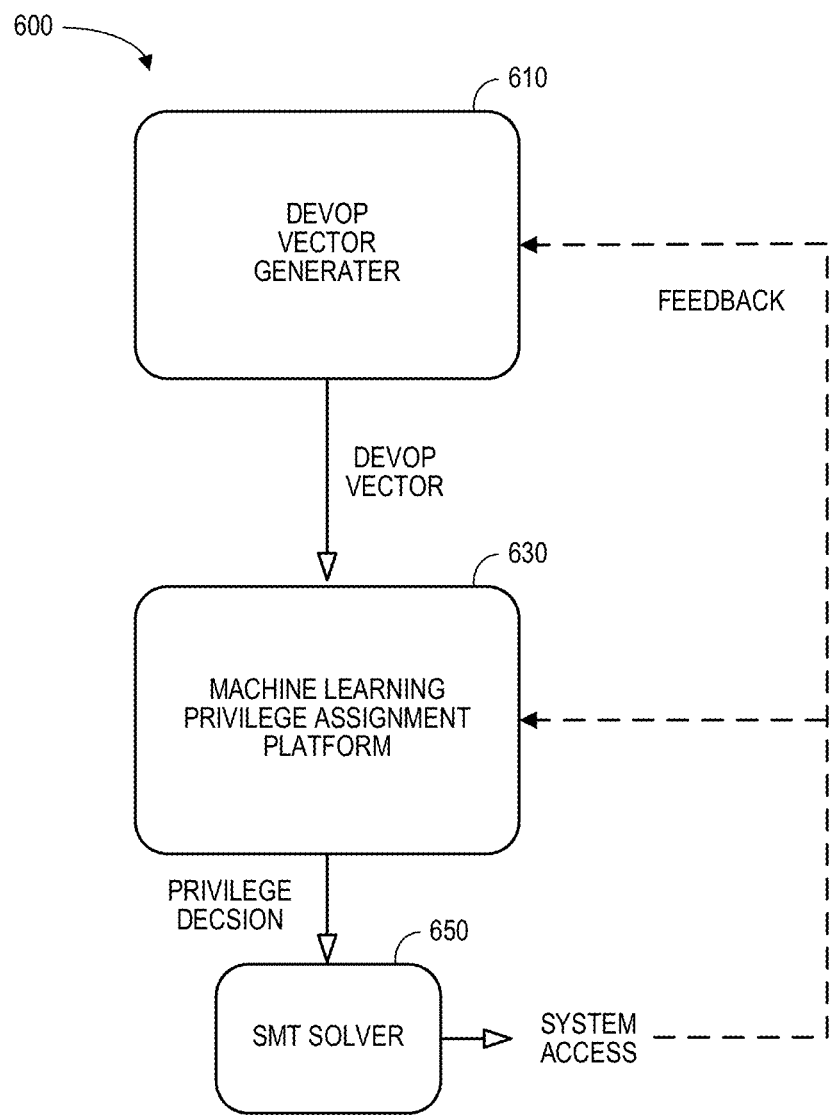
FIG. 6 illustrates the use of feedback data according to some embodiments.

According to some embodiments, information about other users, other privilege decisions, past privilege decisions and results, etc. may be used to improve performance of the system. For example, FIG. 6 illustrates 600 the use of feedback data according to some embodiments. As before, a devop vector generator 610 may output a devop vector to a machine learning privilege assignment platform 630 which, in turn, may provide a privilege decision to a SMT solver 650 that reviews the decision before granting access to the system. In this embodiment, the system access decision and/or other information maybe fed back to the devop vector generator 610 and/or machine learning privilege assignment platform 630 (as illustrated by dashed lines in FIG. 6) to further train or otherwise tune the performance of the system. For example, if a devop with a particular devop vector is allowed to take a specific action that results in substantial problems, other devops with similar devop vectors may be prevented from taking that specific action in the future.

Thus, embodiments may provide mathematical reasoning for application configuration decisions. In some embodiments, policy definition maybe provided for configurations (and specific parts of a configuration can be defined into a policy as to what can be changed, what values are allowed, and who is allowed to make that change). The owner of the config file may, in some embodiments, attach appropriate policies for the configuration. In addition, an SMT solver may check the policy during design time. This can be deployed as a service and checks may be made for each config (because the configuration tends to change). The change event may, for example, capture the user and the changes being made to the config. These changes can then be run against a policy via an SMT solver during design time.

As a simple explanation, a user may define the following policy for "config1:"

```
{
    "Action": "ChangeDiskType",
    "Policy":"Allow"
    "user": { "user1" },
    "ConfigFile": "config1"
    "Config":"disktype"
}
{
    "Action": "ChangeDiskType",
    "Policy":"!Allow"
    "user": { "user2" },
    "ConfigFile": "config1"
    "Config":"disktype"
}
```

This policy allows configuration changes for config1. In particular, it only allows user 1 to change configuration change DiskType (and disallows user 2 from changing the disk type). A user may then attach this policy to the configuration. A configuration engine turns this into a mathematical formula such as:

!User 1 ˆ config1 ˆ changeDiskType or:

!User 2 ˆ config1 ˆ changeDiskType

Since administrators understand that a change of DiskType can lead to a disk copy (and can cause outage), they define a policy at global level to disallow any DiskType changes except for admin users for this configuration file:

!User admin ^ config1 ^ changeDiskType=0

Now suppose that, as user 1, a person modifies config1 and goes ahead and changes DiskType. Since the configs are stored in source code repositories (e.g., git), this triggers a hook configured on detecting a code change. This hook extracts the delta changes in config and feeds them to a central service called the ConfigValidator. This service may then extract the context:

the user who triggered the change,
the actual changed configuration; and
the policy defined for the specific configuration attribute.

When the context is determined, the system runs an SMT solver against the policy. The SMT solver checks to determine if the policies defined for the resource violate any global policy checks. In the example of a DiskType change, the solver will detect an anomaly and raise an alert blocking the workflow and preventing the code changes from being rolled in unless an administrator changes the specific attribute (which might be needed in some situations). As a result, the process may work at design time and save outages, unnecessary usage of resources, etc.

Thus, embodiments may apply artificial intelligence and/or machine learning techniques in the area of contextual soft policies for configurations. Generation of a devop vector is a mathematical representation of the devop in a high dimension vector space. Note that embodiments may be used for other situations instead of, or in addition to, configurations such as by clustering similar devops who are skillful at working on certain specific troubleshooting areas.

This vector representation can then be used to train a model based on data (e.g., having a neural network learn a function) as to whether a specific devop should be allowed to modify a config or not. This is where context may be captured from historical data. Examples of context might include, for example, the experience of a devop in a specific domain and whether the outcome of his or her config changes were positive (or negative). By contextualizing the data, the network can then map whether a specific devop (or similar skillset person) should be allowed (or disallowed) to modify the config.

One goal of some embodiments of the present invention is the creation and generation of "devop" vectors. A devop may refer to, for example, a person who develops and/or operates individual software deployments, modifies and applies configurations to the same, etc. These people will have different level of skillsets in individual domains.

Consider, for example, an operator deploying Java-based workloads on Kubernetes. The Java application configuration might be modified and applied by a devop person and pushed to apply those changes. In this case, there may be devops with different levels of expertise, such as a newly hired person, a person with intermediate skills, and an expert. The system may generate a devop representation based on the relevant skills. It might be as simple as one hot encoded vector or something learnt by training a neural network. The input for learning such a vector could be the textual representation such as resume or types of projects done in opensource, etc. Assume the system has a way to get a vector representation which, when given as input to a classifier like a neural network, classifies a devop into these three categories: beginner, intermediate, and expert.

A second goal of some embodiments of the present invention is the use of a neural network which takes historical data from IT tickets, logs, etc. and trains a neural network with an input of the devop vector representation and an output indicating a privilege to allow/disallow modification of a specific configuration or a set of configs. By training such a network, embodiments may extract a probability of whether a specific config can (or cannot) be safely applied by a particular user.

In the case of a newly hired devop, the system may generate a vector representation based on his or her previous skills and work experience. This representation may also take into account whether a user is knowing a specific domain (e.g., Java 2 Platform Enterprise Edition ("J2ee")). When this user changes an application configuration (e.g., changing the Garbage Collection ("GC") type for a Java application), during the configuration validation workflow the vectorized representation is given to a trained model trained on the specific configurations or a class of such configurations. The output from the model might be a probability as to whether the user (associated with the input vector representation) is allowed to make this change. The output would be in a form of probability (e.g., 0.8). The model that generated this output might be trained on users which are similar in skills to the user for which this check is being done.

Note that it is not necessary that learning happens for the same user, but it may instead happen on similar users with a similar profile or skills. The system could still recommend if a certain change by a specific type of user has caused concerns and should be allowed (or not allowed) to make that particular change. In the example of a GC type change, the update might have been allowed if the application is not a substantially latency-sensitive system. Similarly, a disk change might be allowed if system learns that it does not lead to a substantial data copy based on past data.

Thus, the system may create a devop representation which ("devop vector") which is an input to a neural network trained using historical data as to how to map a devop vector to a privilege letting a user make a change in configuration (or not). The tool may act as a recommender in a change request workflow (e.g., initiated in github) to recommend whether a change by a "similar" user should be allowed/disallowed. The change can also be checked against an SMT solver to determine if it violates any global constraints.

Figure 7:
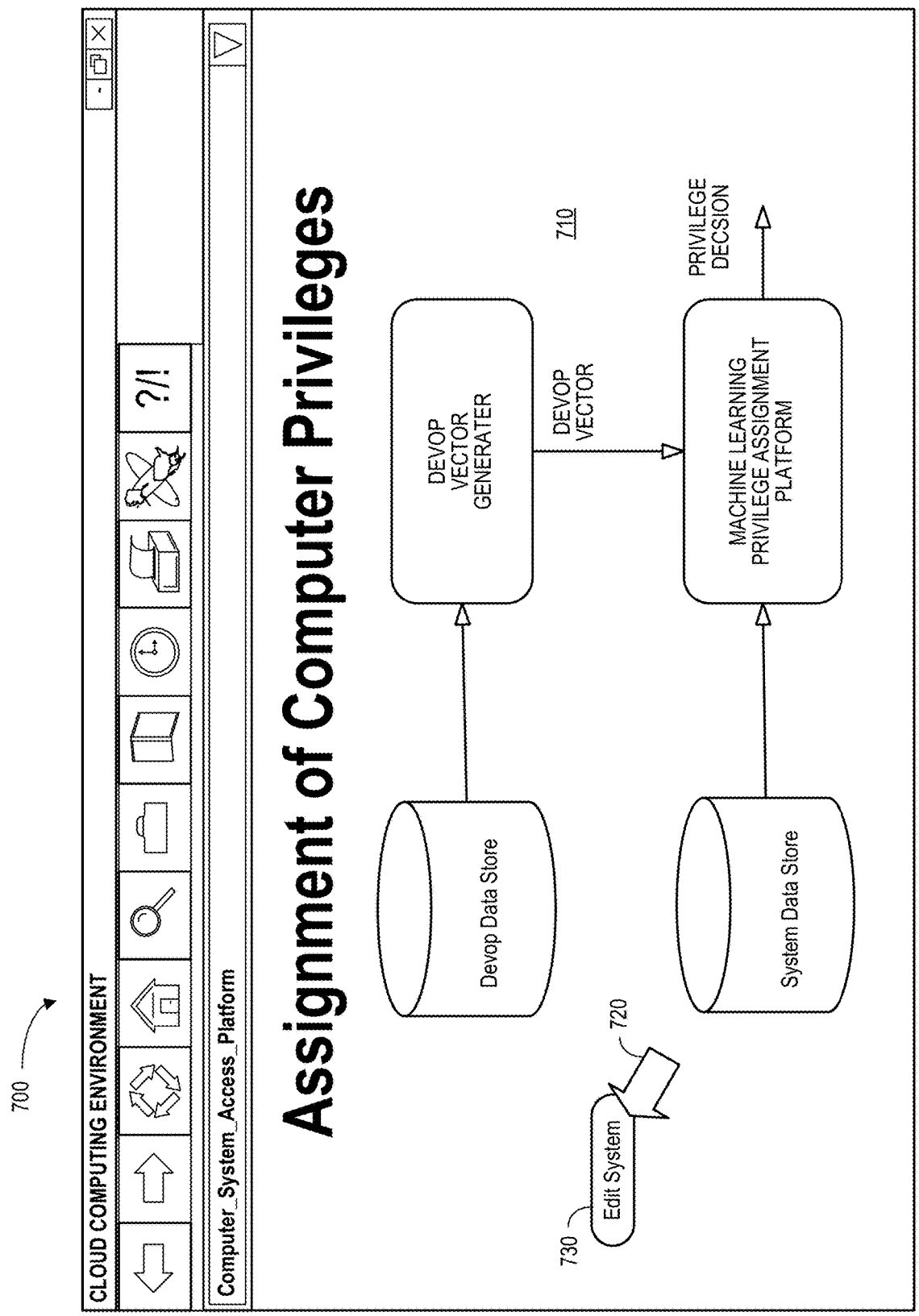
FIG. 7 is a user interface display according to some embodiments.

FIG. 7 is a computer privilege assignment display 700 according to some embodiments. The display 700 includes a graphical representation 710 of the elements of a system in accordance with any of the embodiments described herein. Selection of an element on the display 700 (e.g., via a touchscreen or a computer pointer 720) may result in display of a popup window containing more detailed information about that element and/or various options (e.g., to add a data element, modify a mapping, etc.). Selection of an "Edit System" icon 730 may let an operator or administrator change a data store, initiate neural network training, etc.

Figure 8:
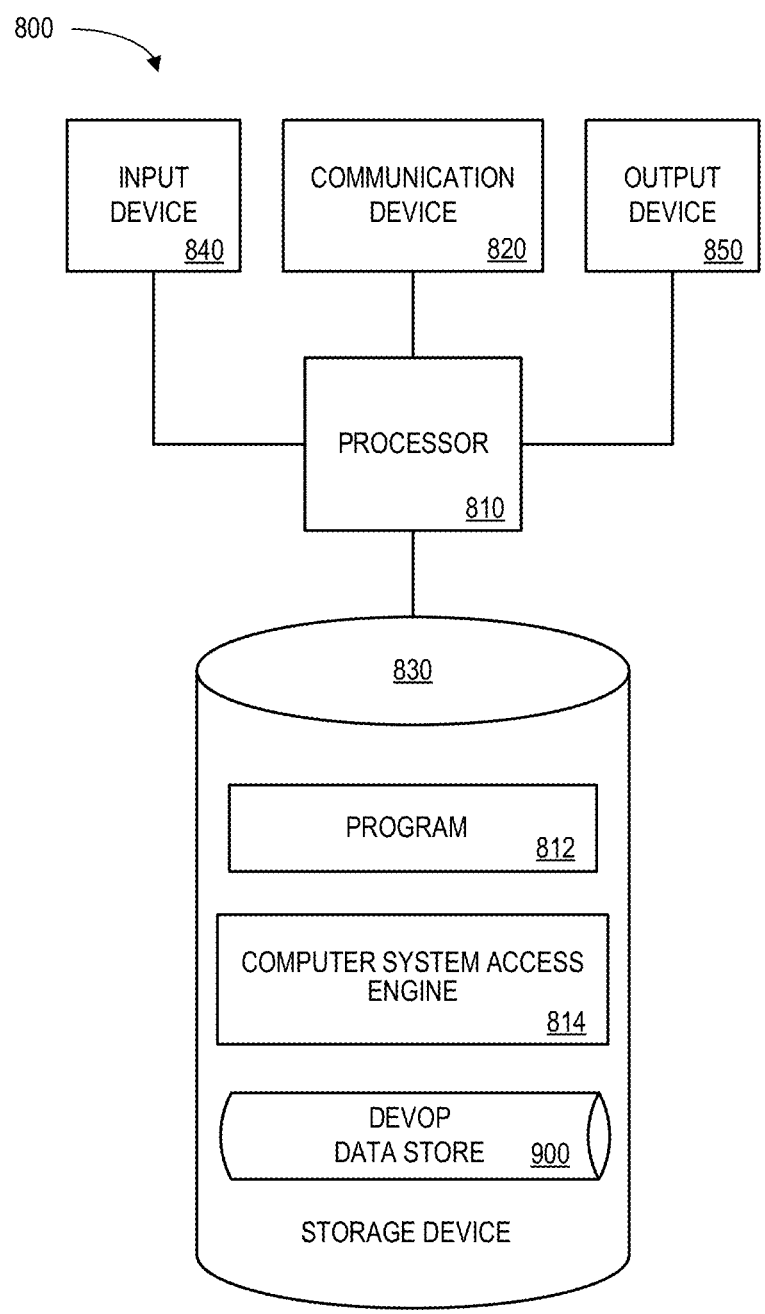
FIG. 8 is an apparatus or platform according to some embodiments.

Note that the embodiments described herein may also be implemented using any number of different hardware configurations. For example, FIG. 8 is a block diagram of an apparatus or platform 800 that may be, for example, associated with the systems 100, 300, 500, of FIGS. 1, 3, 5, respectively (and/or any other system described herein). The platform 800 comprises a processor 810, such as one or more commercially available Central Processing Units ("CPUs") in the form of one-chip microprocessors, coupled to a communication device 860 configured to communicate via a communication network (not shown in FIG. 8). The communication device 860 may be used to communicate, for example, with one or more remote user platforms, administrator platforms, etc. The platform 800 further includes an input device 840 (e.g., a computer mouse and/or keyboard to input cloud computing information) and/an output device 850 (e.g., a computer monitor to render a display, transmit recommendations, and/or create reports about computer privilege decisions, etc.). According to some embodiments, a mobile device, monitoring physical system, and/or PC may be used to exchange information with the platform 800.

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 812 and/or a computer system access engine 814 for controlling the processor 810. The processor 810 performs instructions of the programs 812, 814, and thereby operates in accordance with any of the embodiments described herein. For example, the processor 810 may access information about a user (e.g., a software deployment developer or operator) in a user data store that contains electronic records each associated with a user. Each record may include, for example, a user identifier and user characteristics. Based on the user characteristics, the processor 810 may automatically generate a user vector indicating a computing environment skillset level for that user (e.g., beginner, intermediate, or expert). The processor 810 might receive an indication of the user vector for the user and, based on the user vector and a machine learning algorithm, generate a privilege decision for that user (e.g., when the user attempts to update the system). An indication of the privilege decision may be output, according to some embodiments, to a SMT solver to review the privilege decision before granting the user access to the computing environment.

The programs 812, 814 may be stored in a compressed, uncompiled and/or encrypted format. The programs 812, 814 may furthermore include other program elements, such as an operating system, clipboard application, a database management system, and/or device drivers used by the processor 810 to interface with peripheral devices.

As used herein, information may be "received" by or "transmitted" to, for example: (i) the platform 800 from another device; or (ii) a software application or module within the platform 800 from another software application, module, or any other source.

In some embodiments (such as the one shown in FIG. 8), the storage device 830 further stores a devop data store 900. An example of a database that may be used in connection with the platform 800 will now be described in detail with respect to FIG. 9. Note that the database described herein is only one example, and additional and/or different information may be stored therein. Moreover, various databases might be split or combined in accordance with any of the embodiments described herein.

Referring to FIG. 9, a table is shown that represents the devop data store 900 that may be stored at the platform 800 according to some embodiments. The table may include, for example, entries associated with users who might attempt to apply changes to a computing environment. The table may also define fields 902, 904, 906, 908, 910 for each of the entries. The fields 902, 904, 906, 908, 910 may, according to some embodiments, specify: a devop identifier 902, a devop resume 904, devop log files 906, supplemental data 908, and a devop vector 910. The devop data store 900 may be created and updated, for example, when new employees are hired, leave an enterprise, update their resume, etc.

The devop identifier 902 might be a unique alphanumeric label that is associated with a user who might attempt to deploy an application, change a resource configuration, etc. The devop resume 904 might be a text file explaining the skills of that user. The devop log files 906 might indicate past change made by the user and the supplemental data 908 could including third-party data, published technical articles, social media posts, etc. The devop resume 904, devop log files 906, and supplemental data 908 might then be used by a rule, algorithm, neural network, etc. to automatically generate the devop vector 910 indicating the level of skill of the user (e.g., beginner, intermediate, expert, knowledgeable able Java, experienced with GC changes, etc.).

Thus, embodiments may use artificial intelligence and/or machine learning techniques in the area of contextual soft policies for configurations. Embodiments may generate a devop vector which is a mathematical representation of the devop in a high dimension vector space. The system may use this vector representation to train based on data (e.g., causing a neural network to learn a function) about whether a specific devop should be allowed to modify a config (or not). The context may be captured from historical data (e.g., the experience of a devop in a specific domain, whether an outcome of his or her config changes were positive or negative). By contextualizing the data, the network can then map whether a specific devop (or a similar skillset person) should be allowed or disallowed to modify the config.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 10:
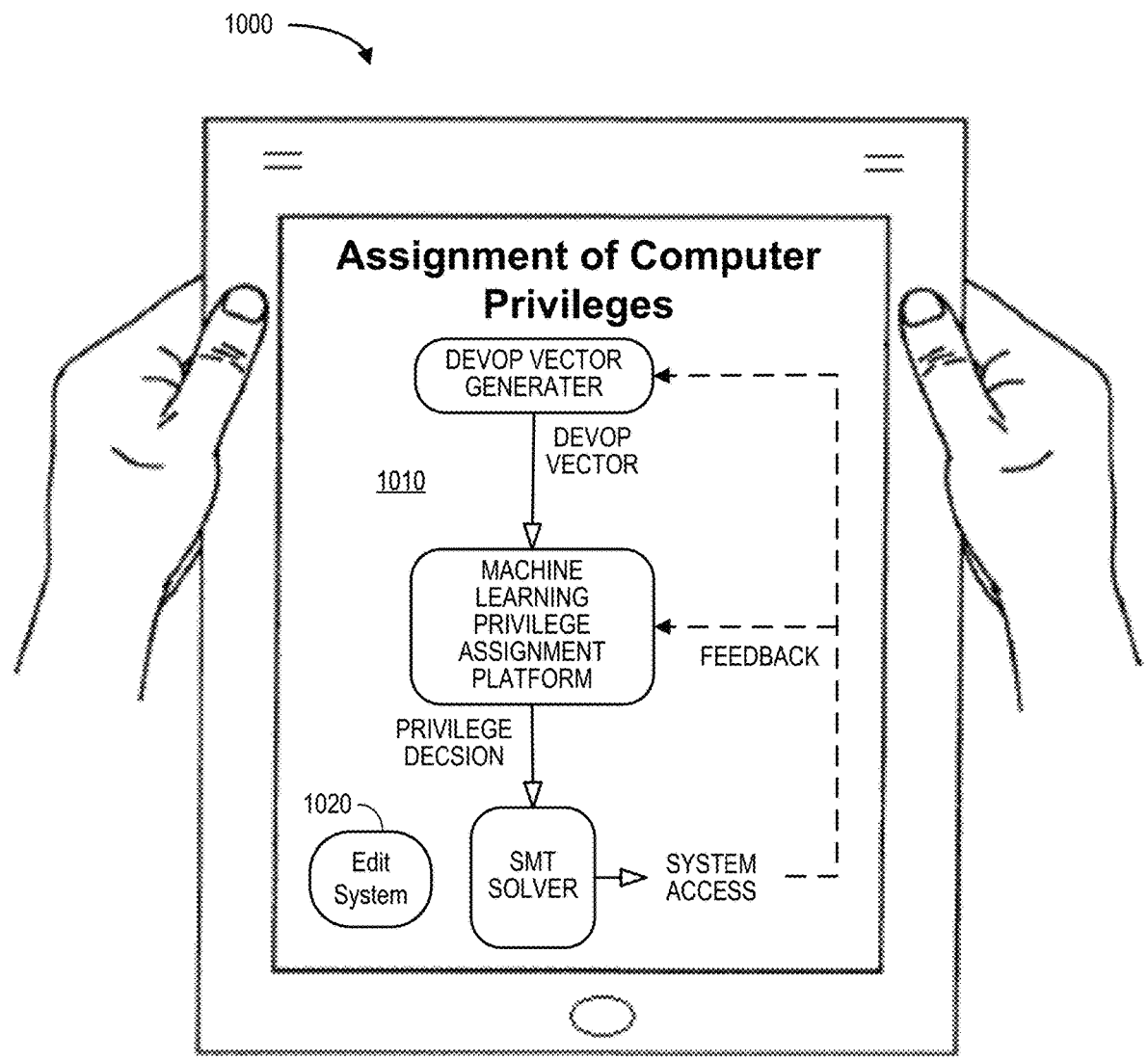
FIG. 10 is a tablet computer display in accordance with some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of configuration changes, any of the embodiments described herein could be applied to other types of computing system changes. Moreover, the displays shown herein are provided only as examples, and any other type of user interface could be implemented. For example, FIG. 10 illustrates a handheld tablet computer 1000 showing an assignment of computer privileges display 1010 according to some embodiments. The assignment of computer privileges display 1010 might include user-selectable data that can be selected and/or modified by a user of the handheld computer 1000 (e.g., via an "Edit System" icon 1020) to view updated information about user vectors, system decisions, results of configuration changes, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with user access to a computing environment, comprising:
 a user data store containing electronic records each associated with a user, each record including a user identifier and user characteristics;
 a user vector generator, coupled to the user data store, including a computer processor and a computer memory storing instructions that, when executed by the computer processor, cause the user vector generator to:
  access information about a user in the user data store,
  based on the user characteristics, automatically generate a user vector indicating a computing environment skillset level for that user based on machine learning trained with a user resume and user log files, and
  output an indication of the user vector; and
 a machine learning privilege assignment platform adapted to:
  receive the indication of the user vector,
  based on the user vector and a machine learning algorithm, generate a privilege decision for that user responsive to a requested computing environment change associated with at least one of: (i) software deployment development, (ii) software deployment operation, (iii) a software deployment modification, and (iv) applying a software deployment configuration, and
  output an indication of the privilege decision.

2. The system of claim 1, wherein the machine learning is further trained using supplemental data.

3. The system of claim 2, wherein the supplemental data includes all of: (i) social media data, (ii) a supervisor evaluation, (iii) published papers, and (iv) third-party data.

4. The system of claim 1, wherein the user vector indicates at least one of: (i) a beginner user, (ii) an intermediate user, and (iii) an expert user.

5. The system of claim 1, wherein the user comprises at least one of: (i) a developer, and (ii) an operator.

6. The system of claim 1, wherein the machine learning algorithm is associated with a neural network.

7. The system of claim 6, wherein the neural network is trained using all of: (i) system tickets, (ii) system change log files, and (iii) supplemental data.

8. The system of claim 1, further comprising:
 a Satisfiability Modulo Theories solver to review the privilege decision before granting the user access to the computing environment.

9. A computer-implemented method associated with user access to a computing environment, comprising:
 accessing, by a computer processor of a user vector generator, information about a user in a user data store that contains electronic records each associated with a user, each record including a user identifier and user characteristics;
 based on the user characteristics, automatically generating a user vector indicating a computing environment skillset level for that user based on machine learning trained with a user resume and user log files; and
 outputting an indication of the user vector;
 receiving, by a computer processor of a machine learning privilege assignment platform, the indication of the user vector for the user from the user vector generator;
 based on the user vector and a machine learning algorithm, generating a privilege decision for that user responsive to a requested computing environment change associated with at least one of: (i) software deployment development, (ii) software deployment operation, (iii) a software deployment modification, and (iv) applying a software deployment configuration; and
 outputting an indication of the privilege decision to a Satisfiability Modulo Theories solver to review the privilege decision before granting the user access to the computing environment.

10. The computer-implemented method of claim 9, wherein the machine learning algorithm is associated with a neural network trained using all of: (i) system tickets, (ii) system change log files, and (iii) supplemental data.

11. The computer-implemented method of claim 10, wherein the machine learning is further trained using supplemental data.

12. The computer-implemented method of claim 9, wherein the user vector indicates at least one of: (i) a beginner user, (ii) an intermediate user, and (iii) an expert user.

13. A non-transitory, computer readable medium having executable instructions stored therein that, when executed by a computer processor cause the processor to perform a method associated with user access to a computing environment, the method comprising:
 accessing, by a user vector generator, information about a user in a user data store that contains electronic records each associated with a user, each record including a user identifier and user characteristics;
 based on the user characteristics, automatically generating a user vector indicating a computing environment skillset level for that user based on machine learning trained with a user resume and user log files;
 outputting an indication of the user vector;
 receiving, by a computer processor of a machine learning privilege assignment platform, the indication of the user vector for the user;
 based on the user vector and a machine learning algorithm, generating a privilege decision for that user responsive to a requested computing environment change associated with at least one of: (i) software deployment development, (ii) software deployment operation, (iii) a software deployment modification, and (iv) applying a software deployment configuration; and
 outputting an indication of the privilege decision to a Satisfiability Modulo Theories solver to review the privilege decision before granting the user access to the computing environment.

14. The computer readable medium of claim 13, wherein the machine learning is further trained using supplemental data.

15. The computer readable medium of claim 13, wherein the machine learning algorithm is associated with a neural network trained using all of: (i) system tickets, (ii) system change log files, and (iii) supplemental data.

* * * * *